July 5, 1966 C. VAN DER LELY 3,258,902
AGRICULTURAL MACHINES
Filed Sept. 22, 1964 6 Sheets-Sheet 1

INVENTOR.
CORNELIS VAN DER LELY
BY
Mason, Mason & Albright
Attorneys

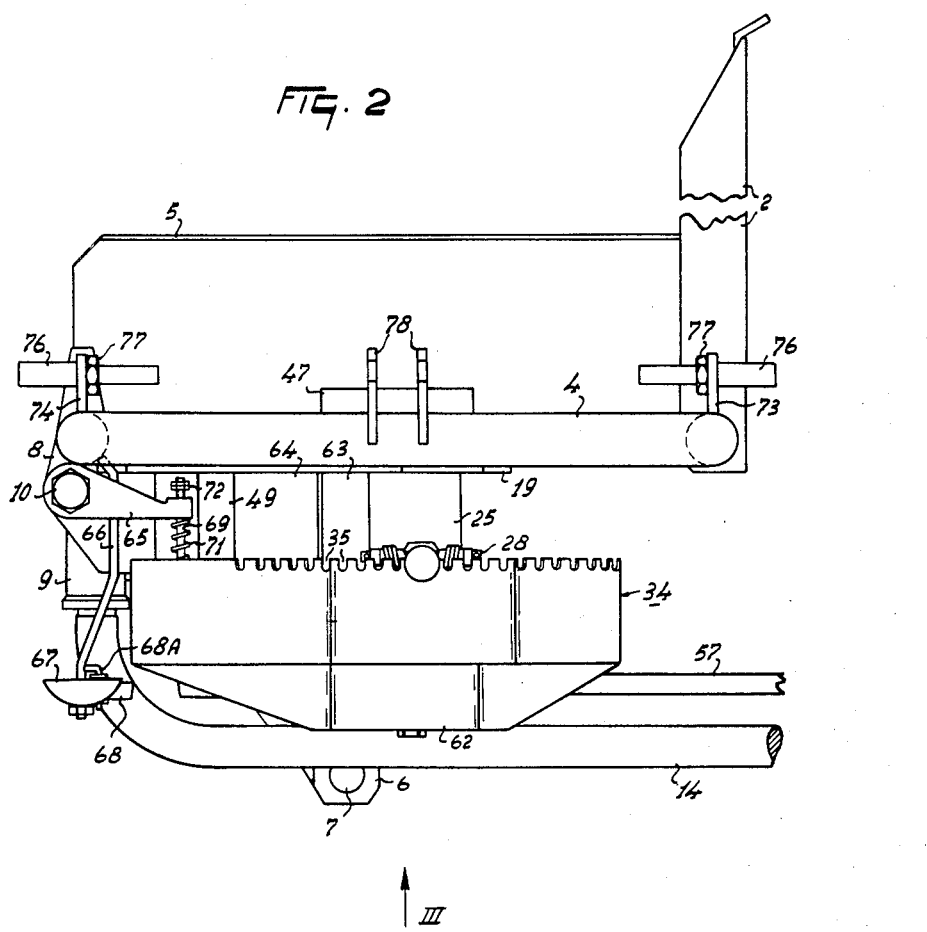

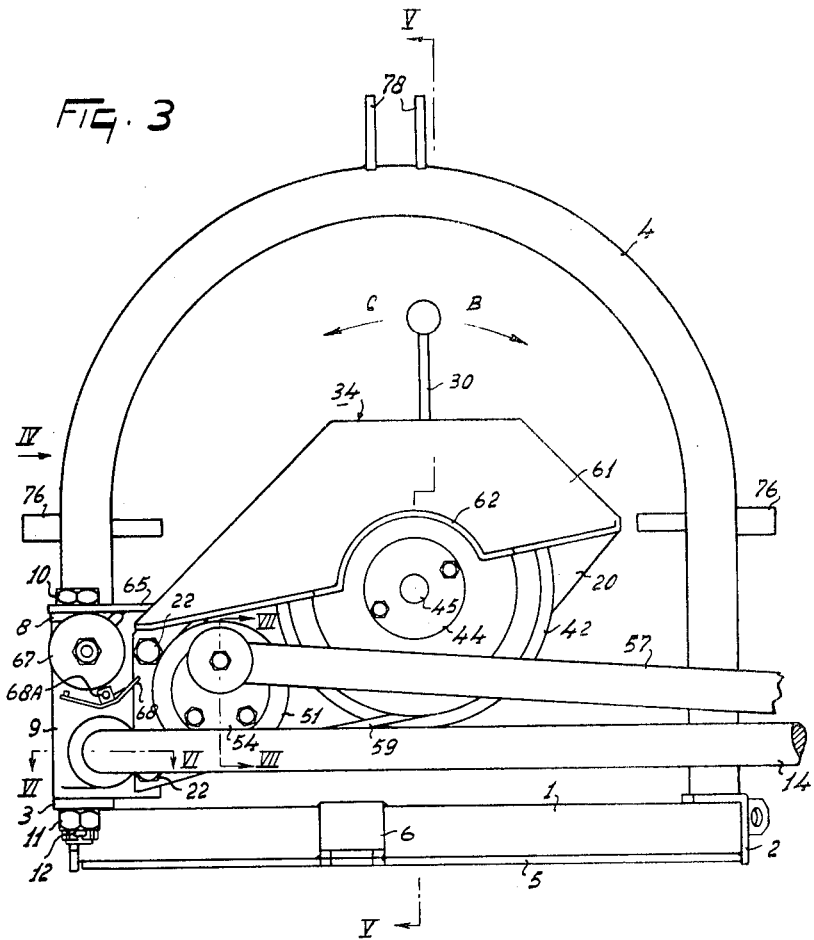

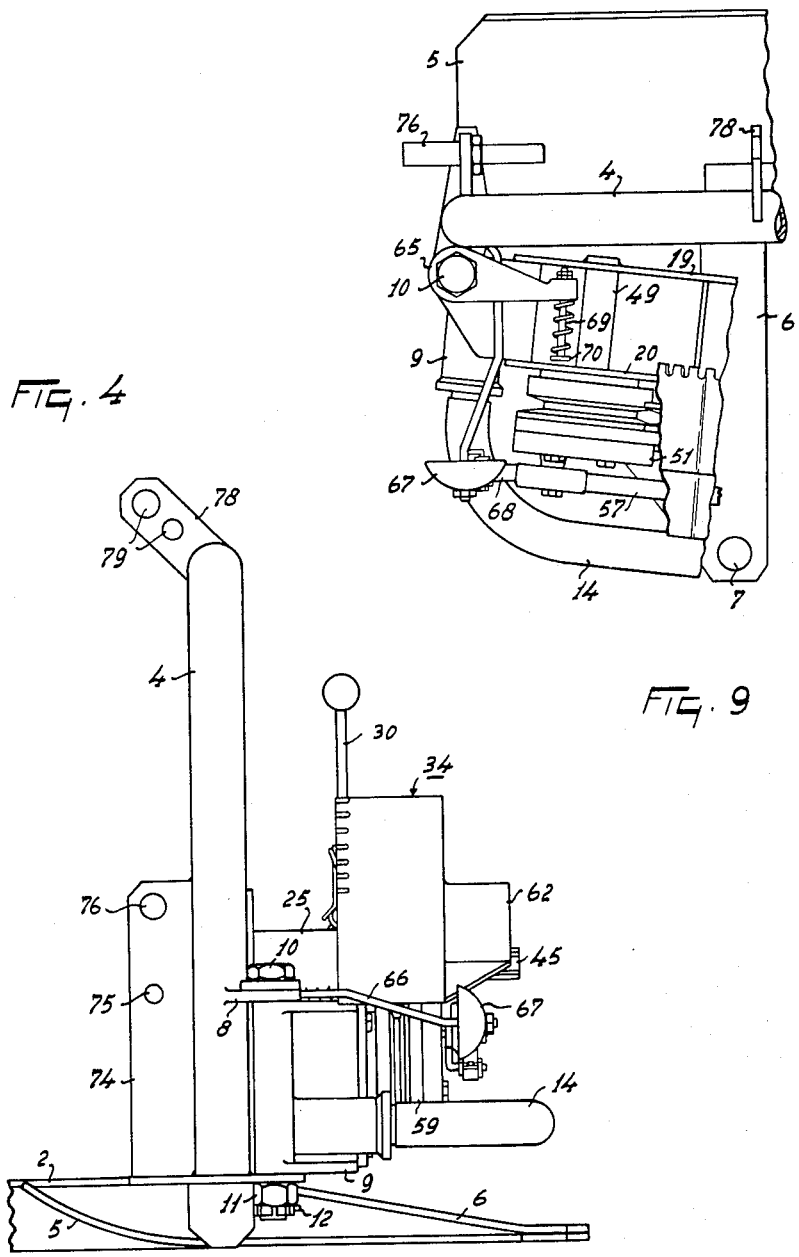

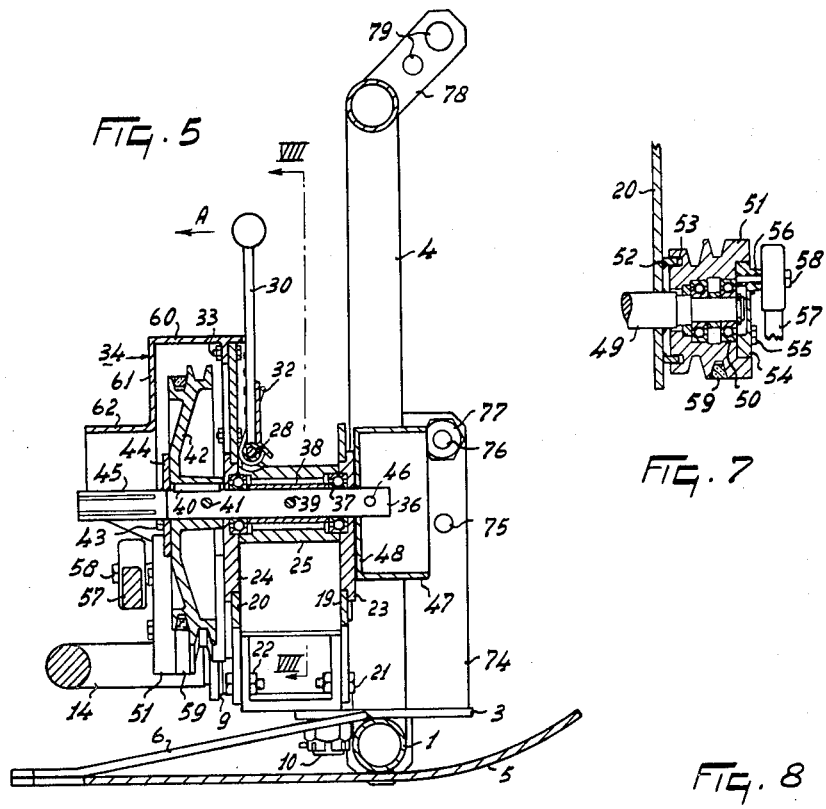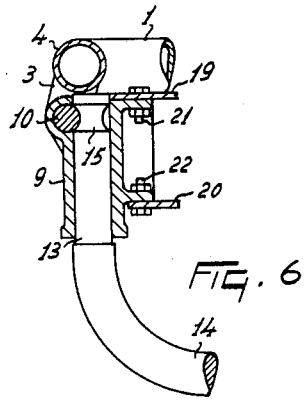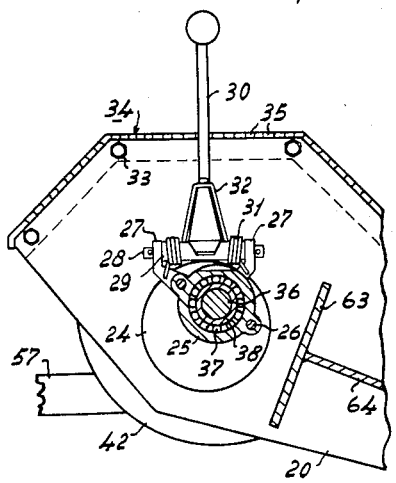

July 5, 1966  C. VAN DER LELY  3,258,902
AGRICULTURAL MACHINES
Filed Sept. 22, 1964  6 Sheets-Sheet 6

INVENTOR.
CORNELIS VAN DER LELY
BY
Mason, Mason & Albright
Attorneys

United States Patent Office 3,258,902
Patented July 5, 1966

3,258,902
AGRICULTURAL MACHINES
Cornelis van der Lely, Zug, Switzerland, assignor to Texas Industries Inc., Willemstad, Curacao, Netherlands Antilles, a limited-liability company of the Netherlands
Filed Sept. 22, 1964, Ser. No. 398,184
Claims priority, application Netherlands, Oct. 8, 1963, 298,970
8 Claims. (Cl. 56—25)

The invention relates to an agricultural machine comprising an engine and an implement which is driven by the engine through a belt, which is guided along two pulleys located at a given distance from each other and adapted to rotate about axes of rotation.

In accordance with the invention at least one of the pulleys is adapted to be turned with the aid of a hand lever about a pivotal axis extending parallel to the axis of rotation of said pulley and to be fixed in different positions against rotation about the pivotal axis, while the distance between the axis of rotation of the pulley and the pivotal axis is smaller than half the diameter of the pulley.

In this way a simple and rugged structure can be obtained for stretching the belt transmission.

The invention relates to a mowing machine comprising a frame and a mowing beam, coupled with said frame and adapted to pivot with respect to the frame about an upwardly extending pivotal axis, there being provided means which tend to hold the mowing beam in a position suitable for normal operation, the arrangement being such that with respect to the frame the mowing beam will pivot when the forces exerted on the mowing beam in operation the mowing device comprising a member for producing a signal.

In known machines of the kind set forth the driver of the vehicle with which the machine is coupled receives a signal only once. In the course of operation this signal may be missed, so that the effect of the warning gets lost. The invention has for its object to obviate this disadvantage by having the signalling member actuated by a part of the drive of the mowing beam, when the mowing beam has pivoted through a given angle out of its normal operational position.

This permits of producing a signal several times, so that the driver of the vehicle will be certain aware of the fact that the mowing beam does no longer occupy its correct position.

For a better understanding of the invention and to show how the same may be readily carried into effect, reference is made by way of example to the accompanying drawing, in which FIG. 1 is a plan view of a mowing machine according to the invention, which is attached to the rear side of a tractor.

FIG. 2 shows on an enlarged scale part of the mowing machine of FIG. 1.

FIG. 3 is an elevation taken in the direction of the arrow III in FIG. 2.

FIG. 4 is an elevation taken in the direction of the arrow IV in FIG. 3.

FIG. 5 is a sectional view taken on the line V—V in FIG. 3.

FIG. 6 is a sectional view taken on the line VI—VI in FIG. 3.

FIG. 7 is a sectional view taken on the line VII—VII in FIG. 3.

FIG. 8 is a sectional view taken on the line VIII—VIII in FIG. 5.

FIG. 9 is a plan view part of the mowing machine of FIG. 1 on an enlarged scale, the mowing beam being in the pivoted position.

Figure 1:
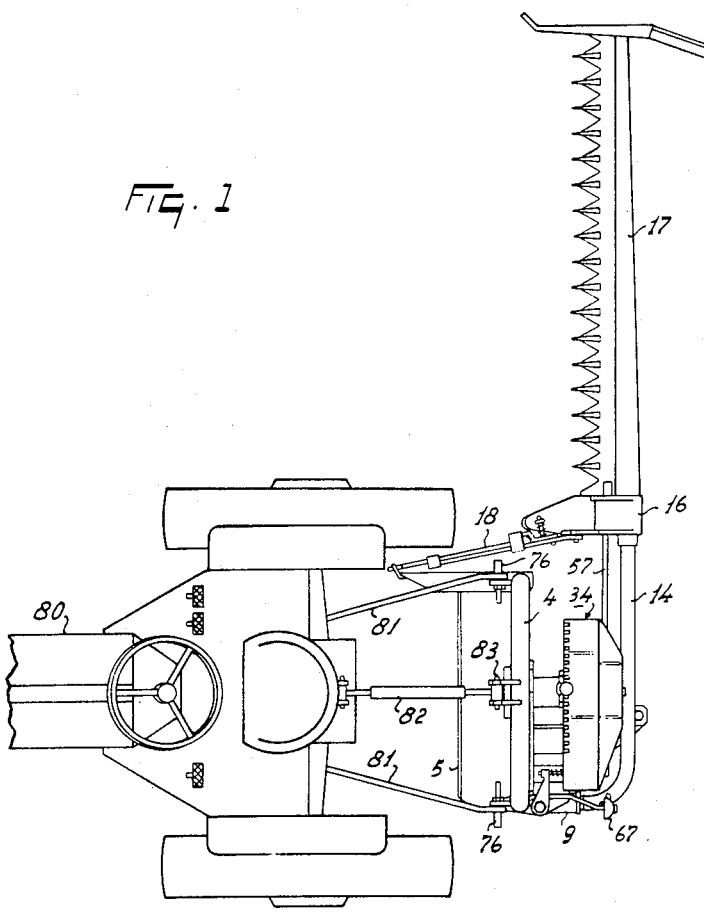

The frame of the mowing machine shown in the figures comprises a horizontal frame beam 1, to one end of which is secured a forwardly protruding angle-section iron 2. A horizontal plate 3, lying above the beam 1, is secured to the other end thereof. A U-shaped frame beam 4, extending parallel to a vertical plane, is secured at one end to the portion of the plate 3 lying above the beam 1 and at the other end to the limb of the beam 2, lying above the beam 1.

To the lower side of the frame beam 1 there is fastened a plate 5, the portion of which lying behind the frame beam is parallel to a horizontal plane, whereas the portion lying in front of the frame beam 1 is bent upwardly. The connection between the frame beam 1 and the plate 5 is stiffened by means of a strip 6, which extends between the upper side of the frame beam 1 and the rear side of the plate 5. The portion of the strip 6, engaging the plate 5, and the portion of the plate lying beneath the former, are provided with registering holes 7.

At a given distance above the plate 3 a plate 8 is fastened to the frame beam 4 in parallel with the plate 3. Between the two plates 3 and 8 there is arranged a housing 9 of cast material, for example, cast iron or cast steel. The housing 9 is pivotally linked to the plates 3 and 8 with the aid of a shaft formed by a bolt 10, which is taken through holes provided in the plates 3 and 8 and through a bore provided in the housing 9 (FIGS. 3 and 6). A nut 11 is screwed onto the lower end of the vertical bolt 10, said nut being secured by means of a split pin 12.

The housing 9 is provided with a second bore accommodating the end 13 of a coupling arm 14. The horizontal, round end 13, which forms a shaft, is provided with a continual groove 15. The position of the bores accommodating the end 13 and the bolt 10 is such that the bolt 10 lies in the groove 15 (FIG. 6). In this way the bolt 10 safeguards the portion 13 against displacement in its longitudinal direction with respect to the housing 9 so that the portion 13 can turn about its center line and about the bolt 10.

The end of the coupling bar 14 remote from the end 13 is secured to a housing 16. A mowing beam 17 is fastened to the side of the housing 16 remote from the coupling bar 14. The housing 16 accommodates the cutter driving mechanism of the mowing beam. A locking member 18, known per se is secured at one end to the housing 16 and at the other end to the beam 2.

The housing 9 has furthermore secured to it two parallel vertical plates 19 and 20 by means of bolts 21 and 22 respectively. On the remote sides of the plates 19 and 20 circular plates 23 and 24 are provided, which have a partly smaller sectional area than the further parts of the plates (FIG. 5). The portions having the smaller diameter are arranged in circular holes provided in the plates 19 and 20. Between the two plates 23 and 24 there is arranged a sleeve 25. The plates 23 and 24 are interconnected by means of bolts 26 extending parallel to the center line of the sleeve 25 and to the center lines of the holes in the plates 19 and 20, said bolts being taken through the holes in the plates 23 and 24 and through recesses provided in the sleeve 25.

From FIGS. 5 and 8 it will be apparent that the center line of the sleeve 25 is at a given distance from the center line of the holes provided in the plates 19 and 20, in which the plates 23 and 24 are accommodated. Two ears 27 are fastened to the sleeve 25 for bearing a shaft 28. The portion of the shaft 28 lying between the ears 27 is surrounded by a sleeve 29, to which a hand lever 30 is secured. The portions of the sleeve 29 located each on one side of the lever 30 are surrounded by a number of steel wire turns 31, which are interconnected by an intermediate piece 32, which bears on the lever. It will be obvious that the spring mechanism formed by the turns 31 and the intermediate piece 32 tends to turn the lever in the direction of the arrow A (FIG. 5). Such a turn of the lever 30 is, however, limited by the side of a screening hood 34, arranged by means of bolts 33 on the plate 20. Said side of the screening hood is provided with a number of recesses 35, in one of which the lever 30 is held in the position shown in the figure. The lever 30 can be turned against the spring force in a direction opposite the arrow A so that the lever 30 can be removed from a recess 35. Then the lever can be turned in the direction of the arrows B or C (FIG. 3), the sleeve 25 and the plates 23 and 24 fastened thereto thus turning about the center lines of the holes provided in the plates 19 and 20. The intention of this displacement will be described more fully hereinafter.

The sleeve 25 accommodates a driving shaft 36 by means of ball bearings 37, which are enclosed between the plates 23 and 24 and a sleeve 38, lying between the bearings and surrounding the shaft 36, and secured to the shaft 36 by means of a pin 39. A rope disc or pulley 42 is fastened with the aid of a wedge 40 and a pin 41 to the end of the shaft 36 projecting on the rear side of the plate 24. With the aid of bolts 43 a plate 44 is secured to the rope disc 42. The plate 44 has secured to it a shaft 45 so that the latter is in line with the shaft 36. The front end of the shaft 36 is provided with a hole 46 for linking a coupling to the end of the shaft 36. Said end is furthermore surrounded by a screening plate 47 concentrical to the shaft and fastened to a plate 48 arranged on and secured to the plate 23.

Between the plates 19 and 20 there is furthermore arranged a driving shaft 49, extending parallel to the driving shaft 36 and rigidly secured to the two plates (FIGS. 2 and 7). A rope disc or pulley 51 is journalled with the aid of two ball bearings 50 on the end of the shaft 49 projecting behind the plate 20. One side of a ring 52, secured to the plate 20 and arranged concentrically to the shaft 49 is accommodated in a groove 53, provided in the rope disc 51. Thus material is prevented from accumulating between the rope disc 51 and the plate 20, which improves the effectiveness of the device. A plate 54 is secured to the rope disc 51 by means of bolts 55. The plate 54 is provided with a stub shaft 56 which extends at a given distance from and parallel to the center line of the shaft 49. The end of a connecting rod 57 is adapted to rotate freely about the stub shaft 56. The connecting rod 57 is held on the stub shaft 56 by means of a bolt 58. The other end of the connecting rod 57 is coupled with the driving mechanism accommodated in the housing 16 for the mowing beam 17. By rigidly securing the shaft 49 to the frame and by arranging the pulley on the short end of the shaft so as to be freely rotatable, a solid structure for the drive of the mowing beam is obtained.

The pulleys 42 and 51 are linked to each other by means of a V-rope 59. From FIGS. 5 and 7 it will be apparent that each pulley is provided with two grooves of different diameters. By changing over the V-rope 59 two different transmission ratios can thus be obtained between the pulley 42 and the pulley 51. The screening hood 34 surrounds the shaft 45, the pulley 41 and the rope 59 partly. For this purpose the screening hood 34 comprises a wall 60 extending parallel to the driving shaft 36, said wall having three portions arranged at an angle to each other. One of said portions, which is located above the pulley 41, extends parallel to a horizontal plane, whereas the two further portions join each one side of said horizontal portion and extend obliquely downwards. To the wall portions parallel to the shaft 36 joins a vertical wall 61, which establishes the connection between the wall 60 parallel to the shaft 36 and a wall 62, surrounding the shaft 45 concentrically through an angle of about 180°, around the center line of the shaft 45.

From FIG. 8 it will furthermore be seen that plates 63 and 64 are arranged for stiffening purposes between the plates 19 and 20.

An arm 65 located between the head of the bolt 10 and the plate 8 is freely rotatable about the bolt 10 (FIG. 2). A rod 66 is fastened to the arm 65. In the position of the device shown in FIGS. 1 and 2 one end of the rod 66 bears on the frame beam 4 (FIG. 2). The other end of the rod 66 is provided with a device for producing a sound signal, formed by a bell 67. A clapper 68 is adapted to turn freely about a shaft 68A, secured to the rod 66. One end of the arm 65 is provided with a hole accommodating a horizontal bolt 69. The portion of the bolt lying between the head 70 of the bolt 69 and the arm 65 is surrounded by a pressure spring 71. Two nuts 72 are screwed to the end of the bolt 69. The bolt 69 is arranged between the two plates 19 and 20 and the length of the bolt is slightly smaller than the distance between these two plates.

Two vertical plates 73 and 74 are secured to the parallel limbs of the curved frame beam 4. Said plates are provided with holes 75, through which pins 76 are taken, said pins being clamped tight to the plates by means of nuts 77. Since the plates 75 are provided with a plurality of holes lying one above the other, the pins can be fixed at different heights to the frame of the mowing device. Two vertical ears 78 are fastened to the upper part of the curved frame beam 4, holes 79 being provided in said ears.

The mowing machine described above may be attached to the lifting device 80 of a tractor, as is shown in FIG. 1, by linking the lowermost arms 81 of the lifting device with the pins 76 and the upper arm 82 by means of a pin 83 to the plates 78.

The machine depicted above operates as follows.

The shaft 36 can be coupled by means of an intermediate shaft with the power take-off shaft of the tractor. The coupling between the intermediate shaft and the shaft 36 is surrounded by the screening plate 47, so that, in general, material is prevented from entangling said coupling. The cutter of the mowing beam 17 can be caused to reciprocate by driving it from the power take-off shaft of the tractor through the shaft 36, the transmission formed by the pulleys 42 and 51 with the rope 59, the connecting rod 57 and the driving mechanism in the housing 16. By turning the hand lever 30 in the direction of the arrow B, the distance between the axes of rotation of the two pulleys will be enlarged, so that the rope 59 is stretched. When the lever is turned in the direction of the arrow C, the distance between the axes of rotation of the two pulleys is reduced, so that at a given instant the rope 59 will no longer drive the pulley 51, so that in spite of a continued rotation of the power take-off shaft the mowing beam is out of operation. Since the lever is located within reach of the driver of the tractor, this adjustment can be readily carried out without the need for the driver to get off the tractor.

With the aid of the coupling member formed by the holes 7 provided in the strip 6 and the plate 5 a further device may be linked to the mowing beam. This device may also be driven mechanically by the shaft 45, if necessary by means of an intermediate shaft. Since, as stated above, the drive of the mowing beam can be switched off, while the shaft 36 and the shaft 45 connected herewith are yet driven, the device coupled with the mowing beam may be driven independently of the mowing beam.

If, in operation, the load on the mowing beam becomes excessively high the locking member 18 will no longer hold the mowing beam in the position shown in FIG. 1; the mowing beam 17 will pivot about the bolt 10. Since the arm 65 with the bell 66 fastened thereto is freely rotatable about the bolt 10, the arm will continue occupying the position shown in FIG. 1 in the event of a small pivotal movement of the mowing beam. When the mowing beam 17 with the arm 14 and the parts secured thereto has turned through a given angle, the clapper 67, as is shown in FIG. 9, will come within reach of the end of the connecting rod 57 so that during each rotation of the connecting rod the clapper is turned by the end of said rod about the shaft 68 and is thus brought into contact with the bell 66. The driver of the tractor is thus warned by the sound signal, indicating an excessive load of the mowing beam. At the instant when the end of the connecting rod comes into contact with the clapper, the end of the bolt 69 comes into contact with the plate 19. Upon a further turn of the mowing beam the arm 65 with the bell attached thereto will be turned about the bolt 10 so that the end of the connecting rod is prevented from coming into contact with the bell itself. Damage to the bell is thus avoided.

Figure 10:
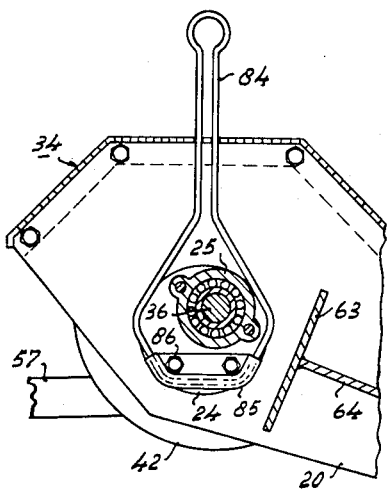
FIG. 10 shows a second embodiment of an adjusting member for the driving shaft of the mowing beam.

FIG. 10 shows a second embodiment of a hand lever. Corresponding parts are designated by the same reference numerals as in the preceding embodiment.

The lever 84 is formed by a spring steel wire which is bent over in hairpin fashion, the ends of the hairpin being passed around the sleeve 25 and being secured to the plate 24 below the sleeve 25 by means of a clamping plate 85 and bolts 86. Since the lever is made of spring material, it can be readily bent in a direction parallel to the center line of the shaft 36 in order to remove the lever from a recess 35, so that the lever with the plate 24 and the sleeve 25 can be turned, after which the two limbs of the lever can be reintroduced into one of the recesses 35 provided in the hood 34.

Figure 11:
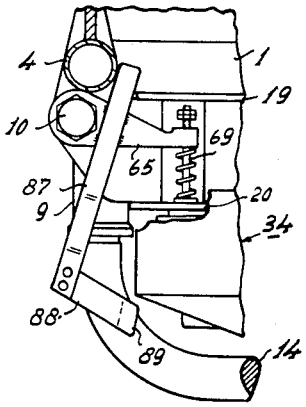
FIG. 11 shows a second embodiment of a signalling device used in a mowing machine according to the invention.

A second embodiment of a signalling member is illustrated in FIG. 11. Similar parts are again denoted by the same reference numerals as in the preceding embodiments. In this embodiment the arm 65 is provided with a strip 87. In the normal operational state of the device one end of the strip engages the frame beam 4 in order to limit a turn of the arm 65 in anti-clockwise direction. At the other end of the strip 87 there are fastened two plates 88 and 89 lying one above the other and made of spring steel. When the mowing beam pivots about the bolt 10, the connecting rod will come into contact with the plate 89 so that the latter is bent away and then leaps back against the plate 88. The plates 88 and 89 thus operate as a kind of rattle.

What I claim is:

1. A mowing machine comprising a frame and a mowing mechanism, pulley means being provided supported by said frame for drivingly connecting said mowing mechanism with the power take-off shaft of a tractor, a sleeve mounted on said shaft, eccentric means secured at each end of said sleeve for receiving said shaft, said pulley means including a first pulley mounted on said shaft, a second pulley and an endless member connecting said pulleys in driving engagement, said first pulley being turnable with said shaft about said eccentric means whereby the distance between said first and second pulleys can be varied, the distance between the pivotable axis and the axis of rotation of said first pulley being less than half the diameter of said first pulley, lever means for turning said first pulley and a housing having a recessed edge being secured to surround said first pulley, said lever cooperating with said recesses to lock same in position after adjustment of said first pulley.

2. The invention of claim 1, wherein the eccentric means is mounted on said shaft adjacent said first pulley.

3. The invention of claim 1, wherein the eccentric means comprises plates with holes off set with respect to the center of the plates.

4. The invention of claim 3, wherein one of said plates is mounted to be turnable within said housing whereby rotation of said plates varies the distance between said pulleys.

5. The invention of claim 3, wherein the lever means is hinged to said sleeve adjacent said one of said plates.

6. The invention of claim 1 wherein the machine has a driver station and lever means for turning said turnable pulley is provided adjacent said station.

7. The invention of claim 1 wherein the lever means is hinged to the sleeve and said lever means includes spring means that urges said lever means against said housing.

8. The invention of claim 1 wherein the lever means is made of spring steel and is secured to the sleeve whereby said lever means is urged by its own tension against said housing.

References Cited by the Examiner
UNITED STATES PATENTS

| | | | |
|---|---|---|---|
| 239,163 | 3/1881 | Hicks | 74—424.16 |
| 300,542 | 6/1884 | Wells | 74—533 |
| 948,804 | 2/1910 | Winterling | 74—533 |
| 1,590,667 | 6/1926 | Armstrong | 74—533 |
| 2,450,080 | 9/1948 | Burrell et al. | 74—242.16 |
| 2,853,843 | 9/1958 | Elfes et al. | 56—25 |
| 2,867,070 | 1/1959 | McCall et al. | 56—296 |
| 2,912,814 | 11/1959 | Witt et al. | 56—296 |
| 2,932,933 | 4/1960 | Elfes et al. | 56—25 |
| 3,041,809 | 7/1962 | Anderson et al. | 56—25 |
| 3,114,996 | 12/1963 | Yeske | 56—25 |
| 3,154,902 | 11/1964 | Halls | 56—25 |

FOREIGN PATENTS 277,511  9/1927  Great Britain.

ABRAHAM G. STONE, *Primary Examiner.*

RUSSELL R. KINSEY, *Examiner.*

M. C. PAYDEN, *Assistant Examiner.*